3,068,149
THERAPEUTIC COMPOSITION AND METHOD OF PRODUCING THE SAME
Jack M. Rose, 215 Hermann Professional Bldg., Houston, Tex.
No Drawing. Filed Feb. 18, 1959, Ser. No. 793,956
7 Claims. (Cl. 167—78)

This invention relates to therapeutic compositions which are useful for the treatment of diseases characterized by the disturbance of the reticulo-endothelial system of humans, and to a method of producing such compositions.

Diseases which are characterized by disturbance of the reticulo-endothelial system include the numerous allergies, and it is a primary object of this invention to provide compositions which are useful for the treatment of such diseases.

Another principal object is the provision of a biochemical method for producing therapeutic compositions useful for the treatment of diseases of the reticulo-endothelial system of humans.

I have found that if a laboratory or host animal is stimulated or "immunized," as it is commonly termed, by the injection of tissue taken from the reticulo-endothelial system of an animal, including humans, afflicted by a disease of said system, it is possible to obtain from the blood of the stimulated animal, after a suitable period of time following injection of the diseased tissue, a substance which extended and varied clinical tests have shown to be exceptionally useful in the treatment of humans suffering from diseases of the reticulo-endothelial system. The diseases, so-characterized, which presently have been found to respond favorably to treatment with my new composition, include numerous types of allergies.

The composition in accordance with this invention is separated from the blood of the stimulated animal by a series of chemical and physical steps selected so as to produce as a final product, a substantially protein-free polypeptide-containing fraction. While the exact chemical composition of the active ingredient has not yet been determined and may, in fact, prove difficultly determinable or perhaps undeterminable, the substance consistently obtainable by the procedure in accordance with this invention, is substantially free of proteins, and contains the polypeptides which constitute the therapeutically active ingredient. The product also contains some of the simpler saccharides and polysaccharides, but these are not thought to be therapeutically active in the treatment of the diseases mentioned.

The procedure for the production of the desired therapeutic composition is begun by injecting into a good antibody-producing animal, tissue taken from the reticulo-endothelial system of an animal or a human afflicted by one of the various diseases of that system, particularly the various allergies.

The tissue employed for injection of antibody-producing animal may be taken from the lymph nodes, spleen, liver, bone marrow, or other portions of the affected reticulo-endothelial system.

The animals employed for stimulation to produce the desired composition may be rabbits, horses, goats or other known good antibody-producing animals, rabbits being preferred at the present time.

The injection of tissue into the antibody-producing animal is usually effected by a series of injections, usually four times weekly for three weeks intravenously, followed by a rest period of three weeks and then one injection intramuscularly every four weeks. At the end of the three months, bleeding can be initiated. The particular injection procedure and the period for stimulation will vary with different animals, but the period mentioned appears to be effective for the purposes here involved, where rabbits are used.

At the end of the stimulation period, blood is taken from the animal and is shaken with glass beads or treated by other suitable and known means in order to de-fibrinate the blood, the remaining liquid being centrifuged to obtain a clear supernate or serum. Following this procedure, a series of steps are conducted on the serum in order to produce the desired final active fraction. This series of steps comprises, first the addition to the clear serum of an equal volume of aqueous sulfo-salicylic acid solution containing from about 15% to about 25% by weight of the acid. A preferred solution is one containing 20% by weight of the sulfo-salicylic acid. The addition to the aqueous solution of sulfo-salicyclic acid results in the formation of a precipitate which is then separated and the liquor discarded. This precipitate comprises various macro-molecules, including proteins and protein conjugates, as for example, albumins, globulins, nucleic acids, and the like. Also in this step, it appears that the action of the sulfo-salicylic acid is to cause cleavage of the nucleo-proteins or other more labile molecules, portions of which remain in the precipitate and other portions of which may be extracted with the liquor from which the precipitate is separated.

The precipitate from the preceding step is then extracted with an ammonium hydroxide solution in an amount sufficient to adjust the pH of the precipitate to a value in the range of from 9.0 to 10.5, and preferably the higher value of 10.5. For this purpose, ordinarily about 2½ volumes of 6% ammonium hydroxide solution will be effective. The precipitate is extracted with the ammonium solution at a slightly elevated temperature in a range of 30° to 55° C. and preferably about 37° C., for a sufficient period of time to complete the extraction by the ammonium hydroxide solution of the fractions which are desired. A period of twenty-four hours at 37° is generally found sufficient for this purpose. The ammonium hydroxide extract is then separated from the residue and the latter is discarded. The ammonium hydroxide solution extracts the desired polypeptides along with saccharides and polysaccharide products and eliminates the majority of the uncleaved proteins from the ammonium hydroxide extract, leaving a crude fraction, including the desired final product in the ammonium hydroxide extract.

The pH value of the ammonium hydroxide extract is then adjusted by acidification wtih a suitable acid, such as hydrochloric acid, to a value from 5.0 to 5.9. A pH value of 5.5 is generally found to be an optimum value. The acidified extract is then chilled to a temperature in the range of from about 4° to 8° C.

An equal volume of 90% ethyl alcohol is then added to the chilled acidified ammonium hydroxide extract and this alcohol solution is allowed to stand at a temperature of from 4° to 8° C. for a period of time sufficient to complete the formation of a precipitate. Generally about twelve hours is required to complete the precipitate. This precipitate is separated from the supernate and the latter is saved. The acidification of the ammonium hydroxide extract and the alcohol precipitation, as above described, eliminates substantially all of the remaining proteins and the more complex saccharides and polysaccharides which remain in the precipitate. The liquor remaining contains the polypeptides and simpler saccharides and polysaccharides.

To the liquor obtained in the last described step an equal volume of 95% ethyl alcohol is added which produces a second precipitate, the solution being allowed to stand for several hours at a temperature in the range of 4° to 8° C. to complete the precipitation. This precipitate is the final desired product and is separated from the alcohol solution, which is discarded.

The final precipitate obtained, as described above, is a light yellowish granular product which, after washing to remove the alcohol solution therefrom, is dissolved in distilled water to a concentration of about 3% by weight, the solution being effected over a period of several hours at a temperature in the range of 4° to 8° C., the material being slowly soluble in water at this temperature. The relatively low temperatures are necessary in order to avoid any decomposition or change in the active material which would occur at more elevated temperatures.

The water solution obtained, as last described, is then sterilized in any conventional manner, as by Seitz filtration, and the filtrate constitutes a final liquid product adapted particularly for parenteral injection.

While in most instances, the liquid solution of the active material is preferred for injection, the solid material may be prepared for oral administration. This is done by evaporating the sterilized water solution to dryness under a vacuum at low temperatures in the range of about −50° C. to −60° C. The solid product resulting from this vacuum evaporation is a brownish highly refractile crystalline substance which may be mixed with other materials for oral administration to the patient.

The successive fractional precipitations with alcohol, as described above, appears to complete the substantial removal of all proteins, leaving in the final product the polypeptides and some of the simpler saccharides and polysaccharide components of the original blood.

The final product produced, as described above, has been employed rather extensively under closely controlled clinical conditions in the treatment of numerous patients suffering from diseases of the reticulo-endothelial system, particularly allergic diseases, with a great deal of effectiveness.

In many instances, the disease appears to have been completely cleared and in others, substantial improvement in the condition of the patient has resulted. It will be understod that while a preferred procedure has been outlined by which a product, which will have the desired therapeutic properties, may be obtained consistently, other procedures for the treatment of the blood taken from the stimulated animal can no doubt be employed to arrive at a final product fraction having the desired characteristics of being substantially protein-free and containing polypeptides.

From the foregoing, it will be seen that this invention has disclosed a new therapeutic composition, and a method of producing the same, which is useful in the treatment of diseases characterized by disturbances of the reticulo-endothelial system of humans.

What I claim and desire to secure by Letters Patent is:

1. A therapeutic composition useful for the treatment of allergic diseases of the reticulo-endothelial system of humans, comprising, the substantially protein-free polypeptide-containing fraction obtained from the blood of an animal which has been stimulated by injection of tissue taken from the reticulo-endothelial system of an animal afflicted by a disease of said system, said fraction being obtained by subjecting said blood to a series of fractionating and treating steps adapted to eliminate therefrom substantially all proteins and non-polypeptide fractions.

2. A therapeutic composition useful for the treatment of allergic diseases of the reticulo-endothelial system of humans, comprising, the substantially protein-free polypeptide-containing fraction obtained from the blood of an animal which has been stimulated by injection of tissue taken from the reticulo-endothelial system of an animal afflicted by a disease of said system, said fraction being obtained by the following steps: (a) separating the clear serum from said blood; (b) reacting said serum with an equal volume of an aqueous solution containing 15% to 25% by weight of sulfo-salicylic acid to produce a first precipitate; (c) adding to said precipitate an aqueous solution containing from 4% to 8% by weight of ammonium hydroxide in an amount adapted to adjust the pH value of the first precipitate in the range of from 9.0 to 10.5; (d) extracting said first precipitate with said ammonium hydroxide solution at a temperature in the range of from about 30° C. to about 55° C. to extract said polypeptide-containing fraction from said first precipitate; (e) acidifying the ammonium hydroxide extract to adjust its pH value to a value in the range of 5.0 to 5.9; (f) subjecting the acidified ammonium hydroxide extract to two fractional precipitations at a temperature in the range of from 4° to 8° C. with successive additions of equal volumes of 90% ethyl alcohol and 95% ethyl alcohol, the final precipitate resulting from the addition of said 95% ethyl alcohol comprising said substantially protein-free polypeptide-containing fraction; (g) dissolving said final precipitate in water at a temperature of from about 4° to 8° C. to a concentration of about 3% by weight; and (h) sterilizing the water solution of said final precipitate.

3. A therapeutic composition according to claim 2 wherein the sterilized water solution of said final precipitate is evaporated to dryness under vacuum at a temperature in the range from about −50° C. to −60° C. whereby to produce a crystalline solid comprising said substantially protein-free polypeptide-containing fraction in a form adapted for oral administration.

4. The method of producing a therapeutic composition useful for hte treatment of allergic diseases of the reticulo-endothelial system of humans, which comprises, introducing tissue taken from the reticulo-endothelial system of an animal afflicted by a disease of said system into a suitable anti-body producing animal to thereby stimulate the latter for the production of the desired therapeutic composition, removing blood from the stimulated animal and treating said blood by procedures appropriate to separate therefrom a substantially protein-free polypeptide-containing fraction, said fraction comprising the desired therapeutic composition.

5. The method of producing a therapeutic composition useful for the treatment of allergic diseases of the reticulo-endothelial system of humans, which comprises, introducing tissue taken from the reticulo-endothelial system of an animal afflicted by a disease of said system into a suitable anti-body producing animal to thereby stimulate the latter for the production of the desired therapeutic composition, removing blood from the stimulated animal, separating the clear serum from said blood, subjecting said serum to reaction with an aqueous solution of sulfo-salicylic acid to produce a precipitate, treating said precipitate by procedures appropriate to effect removal therefrom of substantially all proteins whereby to produce a final residue comprising a substantially protein-free polypeptide-containing fraction comprising the desired therapeutic composition.

6. The method according to claim 5 wherein said aqueous solution of sulfo-salicylic acid contains from 15% to 25% by weight of sulfo-salicylic acid and is added in equal volumes to said serum.

7. The method according to claim 5 wherein the animal from which the diseased tissue is taken is a human.

References Cited in the file of this patent

Nettleship: Amer. J. of Pathology, vol. 21, 1945, page 527.

Day: J. Nat. Canc. Inst., vol. 17:4, October 1956, pages 517–523, 526, 529, 531–532.

Lindner: Fed. Procs., Part 1, 17:1, March 1958, page 446.

Koch: Practical Methods in Biochemistry, 6th ed., 1953, pages 361–362, William & Wilkins Co., Baltimore, Md.

Heyndrickx: PSEBM, vol. 96, October, December 1957, pages 508–512.

American Jurisprudence, Proof of Facts, Annotated, vol. 3, 1959, Jurisprudence Publishers, Inc., Rochester, N.Y. "Cancer," pages 127–160; "Causation-Medical Opinion," pages 167–174.